Sept. 16, 1969   D. J. HARDY ET AL   3,467,215
CUSHION SUPPORTED VEHICLES WITH EXTENSIBLE BASE AREA
Original Filed July 12, 1965

INVENTORS
DEREK J. HARDY
LAVIS A. H. RIDDLE

BY *Larson and Taylor*

ATTORNEYS

United States Patent Office 3,467,215
Patented Sept. 16, 1969

3,467,215
CUSHION SUPPORTED VEHICLES WITH
EXTENSIBLE BASE AREA
Derek James Hardy, Cowes, and Lavis Albert Henry
Riddle, East Cowes, England, assignors, by mesne
assignments, to British Hovercraft Corporation
Limited, Yeovil, Somerset, England
Original application July 12, 1965, Ser. No. 471,336, now
Patent No. 3,373,839, dated Mar. 19, 1968. Divided
and this application Mar. 11, 1968, Ser. No. 712,077
Claims priority, application Great Britain, July 28, 1964,
30,039/64
Int. Cl. B60v 1/16
U.S. Cl. 180—128
11 Claims

ABSTRACT OF THE DISCLOSURE

An air cushion vehice includes an inflatable flexible skirt for selectively forming a suporting air cushion for the main body of the vehicle, at least some of the boundaries of the cushion being outboard of the main body of the vehicle. The inflatable flexible skirt is so connected to the vehicle and is of such configuration that, when inflated, it extends outwardly from the main body of the vehicle, and is supported and maintained in this extended condition by flexible tie members and/or support members which are pivotally connected to the body of the vehicle so as to pivot outwardly upon inflation of the skirt.

CROSS REFERENCE TO RELATED APPLICATIONS

This is a division of our U.S. application Ser. No. 471,336, filed July 12, 1965, entitled "Ground Effect Vehicles With Extensible Base Area" and since issued as Patent No. 3,373,839.

BACKGROUND OF THE INVENTION

This invention relates to air cushion vehicles or ground effect machines of the type which are supported above the surface by a cushion of pressurized air or other fluid which is created and maintained between the bottom area of the vehicle and the surface over which the vehicle is operating. More particularly the invention relates to improved arrangements for forming variable boundaries for the plan area of the vehicle.

Vehicels of the type to which the instant invention relates are well known in the art, and specifically such vehicles are well known which provide below the structure of the vehicle various types of barriers to the escape of air from the cushion or cushions upon which the vehicle is supported. The most successful and advantageous type of barrier developed to date involves the use of a flexible skirting assembly which depends from the rigid base structure of the vehicle to retain the cushion pressure while simultaneously raising the effective operating height of the rigid base structure of the vehicle, the flexible skirting serving to give way and pass over encountered obstacles.

It is generally desriable, and in some roles it is practically necessary, to reduce the plan area of the air cushion vehicel when it is not in use. Thus particularly for those vehices which will be transported in other types of vehicles such as trucks, ships or aircraft, it is imperative that the air cushion vehicle occupy the minimum space while it is being transported. One of the proposed roles for air csuhion vehicles in which this feature will be important involves the operation of an air cushion vehicle from a parent vessel as a rescue vessel or as a lifeboat. Toward minimizing the space required for transport of air cushion vehicles on other types of vehicles, it has been proposed, among other things, to design and build air cushion vehicles which can be broken down into units which are of a size suitable for transporting on other types of vehicle. It is a general object of the instant invention to achieve these same capabilities and characteristics in an air cushion vehicle which does not have to be broken down into components of a size suitable for such transporting. It will be understood, however, that the instant invention is not restricted to air cushion vehicles which are of a size as to be transportable, but the invention advantageously can be applied equally to vehicles of any size.

SUMMARY AND OBJECTS OF THE INVENTION

It is an object of this invention to provide an air cushion vehicle having a rigid base structure which is effectively the load carrying part of the vehicle and which determines the overall dimensions of the vehicle when it is not in operation, the vehicle having means for selectively forming a supporting air cushion of greater lateral area than the lateral area of the rigid base structure and for selectively retracting inwardly toward the rigid base structure so as to reduce the horizontal dimensions of the vehicle when not in operation. More specifically, it is an object of this invention to provide such a vehicle wherein the supporting air cushion during operation is defined at least in part by a flexible skirt connected to the rigid base structure and extending outwardly and downwardly therefrom, the vehicle being provided with suitable tie members and/or pivotally mounted support members extending between points on the rigid base structure and points on the flexible skirt for supporting the skirt in its outwardly and downwardly extending position during operation of the vehicle.

The foregoing objects are achieved in accordance with the invention of this application by providing on the vehicle a flexible inflatable skirt which is so connected to the vehicle and is of such configuration as to extend outwardly and downwardly of the base structure when the skirt is inflated. Flexible tie members connect intermediate portions of the skirt wall to the rigid base structure so as to constrain the inflated configuration and orientation of the skirt. Preferably a substantially rigid member is pivotally connected to the base structure of the vehicle and is connected as its free end to an outer wall portion of the skirt so as to pivot outwardly to a skirt supporting position upon inflation of the skirt. The rigid member is constrained in its skirt supporting position by a flexible tie member extending between the base structure and the free end of the pivotally mounted rigid member.

Other and further objects, advantages and features of the invention will be apparent to those skilled in the art from the ensuing description and illustration of embodiments of the invention.

The novel features that we consider characteristic of our invention are set forth with particularity in the appended claims. The invention itself, however, both as to its organization and its operation, together with additional objects and advantages thereof will best be understood from the following description when considered in connection with the accompanying drawings.

DESCRIPTION OF THE PREFERRED EMBODIMENTS

Figure 1:
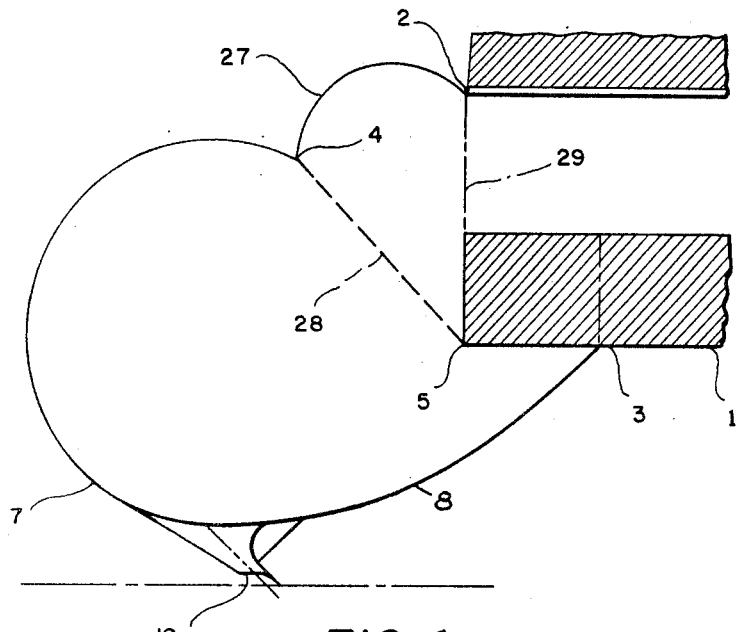
FIGURE 1 is a diagrammatic sectional view showing a portion of the base structure of a ground effect vehicle with a skirt in accordance with the invention mounted thereon in an inflated condition.

We have illustrated in the drawings of this application only so much structure of an air cushion vehicle as is necessary to an understanding of the invention. We have not illustrated the details of the complete vehicle, since the vehicle itself is of a well known construction and may be considered as conventional. Attention is directed to parent application Serial No. 471,336 for further disclosures of air cushion vehicles of the type diagrammatically illustrated herein.

Referring to FIGURE 1, a conventional air cushion vehicle is diagrammatically illustrated at 1. A flexible skirt 7 of flexible sheet material is connected to the base structure 1 of the vehicle at positions of attachment designated by 2 and 3. Pressurized air enters the flexible skirt 7 through an inlet 29 which connects with the main fan of the conventional vehicle, this pressurized air in turn issuing from nozzle openings 19 to create and maintain the supporting air cushion under the vehicle. The upper part of the outer wall of the skirt 7 is attached to the rigid part of the vehicle at 2 by an extenion 27, and a degree of rigidity or stiffness is provided by ties 28 extending between the outer wall of the flexible skirt at 4 and the rigid base structure of the vehicle at 5. The flexible skirt 7 is shown in FIGURE 1 in the inflated condition, that is, the condition during operation of the vehicle. Air is supplied to the skirt through inlet 29 from the main fan or compressor of the vehicle. The skirt is inflated, and the supporting cushion beneath the base structure 1 is generated and maintained by air issuing as a curtain from the nozzles 19. It is to be particularly noted that the skirt 7 in its inflated condition extends beyond the base structure 1, thus establishing a cushion boundary outboard of the base structure, and hence an effective cushion area that is greater than the plan area of the underside of the base structure. The outer wall of the skirt 7 is caused to balloon outwardly and upwardly by the air pressure, but it is constrained by the flexible tie members 28 to assume the double balloon configuration shown in the drawing. The outer wall portion terminates below the base structure 1, and is in effect constrained by the inner wall portion 8 which serves as a tension member connecting the outer wall portion and the nozzles 19 to the base structure of the vehicle. It will be readily apparent that the flexible skirt 7 of FIGURE 1 automatically collapses inwardly toward the vehicle when the supply of pressurized air at inlet 29 is terminated.

Figure 2:
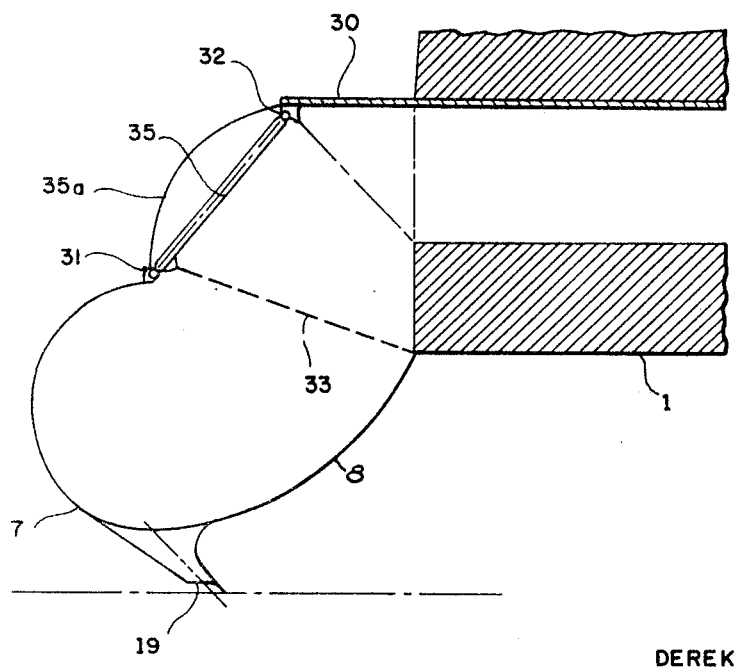
FIGURE 2 is a view corresponding to FIGURE 1 of a similar embodiment of the invention incorporating a pivotally mounted skirt support member in combination with a flexible tie member.

Referring now to FIGURE 2, the flexible skirt of this embodiment is similar to that shown in FIGURE 1. In the embodiment of FIGURE 2, however, flexible tie member 33 extends between the base structure 1 and the free end of a rigid member 35 having ball joints at each end, and pivotally connected at 32 to member 30 which forms a part of base structure 1. A continuous diaphragm 35a is connected at its lower end at 31 to the free end of pivotal member 35, and at its upper end to the base structure of the vehicle. Skirt 7 is connected at its upper end at 31 to the free end of member 35, the flexible diaphragm 35a thus constituting an extension or continuation of the outer wall of the skirt 7, and the member 35 in effect being connected to an intermediate part of the outer wall. Tie member 33 limits the outward pivotal movement of member 35 about its pivotal connection 32, and thus establishes an outermost skirt support position for the member 35. The skirt of FIGURE 2 is shown in its inflated condition, that is, the condition during operation of the cushion vehicle. When the supply of pressurized air to the skirt is terminated, the skirt will collapse inwardly, and the rigid member 35 will pivot inwardly in a counterclockwise direction.

Although we have shown and described certain specific embodiments of our invention, we are fully aware that many modifications thereof are possible and will be apparent to persons skilled in the art. Our invention, therefore, is not to be restricted to the precise details of construction shown and described.

We claim:

1. An air cushion vehicle comprising a base structure arranged for receiving support from an air cushion when formed in a space beneath the base structure, and means connected to said base structure for selectively forming a flexible boundary for the air cushion outboard of said base structure when the vehicle is in operation and for selectively retracting inwardly toward said base structure so as to reduce the lateral dimensions of the vehicle when not in operation, said means comprising a flexible inflatable skirt extending around at least a portion of said base structure, said skirt comprising, when inflated, an outer wall portion of flexible sheet material extending outwarly and downwardly from a first position of attachment to said base structure and terminating below said base structure, flexible tension means connecting the bottom of said outer wall portion to said base structure at a second position of attachment located below said first position of attachment, and a flexible tie member connected to said base structure at a position of attachment below said first position of attachment and extending therefrom and having means connecting the other end of said tie member with an intermediate part of said outer wall portion located inwardly of the outermost extend thereof so as to constrain said outer wall portion, said last mentioned connecting means being disposed above said second position when said skirt is inflated.

2. A vehicle as claimed in claim 1 further comprising a rigid member connected at one to an intermediate part of said outer wall portion and pivotally connected at its other end to said base structure for pivotal movement in a generally vertical plane, said rigid member being constrained as to the limit of its outward pivotal movement.

3. A vehicle as claimed in claim 2 wherein said flexible tie member limits the outward pivotal movement of said rigid member.

4. A vehicle as claimed in claim 3 wherein said flexible tie member is connected to said rigid member adjacent the outer end of the rigid member.

5. A vehicle as claimed in claim 4 wherein said rigid member is pivotally connected to said base structure relatively above said position of attachment of said flexible tie member to said base structure.

6. A vehicle as claimed in claim 5 wherein said rigid member is pivotally connected to said rigid base structure at a location not relatively higher than said first position of attachment.

7. A vehicle as claimed in claim 6 wherein said rigid member is located within the area bounderied by said outer wall portion.

8. A vehicle as claimed in claim 7 wherein said flexible tension means comprises an inner wall portion of flexible sheet material.

9. An air cushion vehicle comprising a base structure arranged to receive support from an air cushion when formed in a space beneath the base structure, a flexible skirt of hollow inflatable form for extending outwardly from said base structure to define a cushion boundary outboard of said base structure when the skirt is inflated, and means connecting said skirt to said base structure to be supported thereby, said means comprising, at least in part, a substantially rigid member pivotally connected at one end to said base structure and at its other end to a wall portion of said flexible skirt so as to pivot outwardly from said base structure to a skirt supporting position upon inflation of said skirt, and at least one tie member for limiting the outward pivotal movement of said substantially rigid member to its skirt supporting position.

10. A vehicle as claimed in claim 9 wherein said skirt comprises an outer wall portion of flexible sheet material connected at its upper end to said base structure, and means connecting the lower portion of said outer wall portion to said base structure relatively lower than the connection of the upper end thereto, said other end of said substantially rigid member being connected to said outer wall portion at a position spaced from the connection of said upper end of said outer wall portion.

11. A vehicle as claimed in claim 10 wherein said outer wall portion comprises a first portion connected at its upper end to said other end of said substantially rigid member, and a second portion connected to and extending between said other end of said substantially rigid member and said base structure.

References Cited

UNITED STATES PATENTS

| | | | |
|---|---|---|---|
| 3,288,235 | 11/1966 | Jones | 180—128 X |
| 3,357,514 | 12/1967 | Jones | 180—128 |

A. HARRY LEVY, Primary Examiner

U.S. Cl. X.R.

180—124